United States Patent
Fukumoto et al.

[15] 3,661,716

[45] May 9, 1972

[54] PROCESS FOR SIMULTANEOUS FRACTIONATION AND PURIFICATION OF PROTEASE AND RIBONUCLEASE OF RHIZOPUS MOLD

[72] Inventors: Juichiro Fukumoto, Takarazuka-shi; Takehiko Yamamoto, Amagasaki-shi, both of Japan

[73] Assignee: Miles Laboratories, Inc., Elkhart, Ind.

[22] Filed: Aug. 8, 1969

[21] Appl. No.: 848,585

[30] Foreign Application Priority Data

Aug. 19, 1968 Japan....................................43/59335

[52] U.S. Cl..............................................................195/66
[51] Int. Cl..........................................................C07g 7/02
[58] Field of Search................................99/98, 145; 195/66

[56] References Cited
UNITED STATES PATENTS

3,036,960   5/1962   Lallouette..................................195/66

*Primary Examiner*—A. Louis Monacell
*Assistant Examiner*—William A. Simons
*Attorney*—Joseph C. Schwalbach, Michael A. Kondzella, Louis E. Davidson and Harry T. Stephenson

[57] ABSTRACT

Purified fractions of protease and ribonuclease produced from a Rhizopus mold can be obtained by contacting a solution containing protease and ribonuclease with a cation-exchange material to selectively adsorb the ribonuclease. The purified protease fraction is then separated from the cation-exchange material. A purified ribonuclease fraction is then removed by elution, for example, from the cation-exchange material. The initial protease and ribonuclease-containing solution is preferably purified to remove amyloglucosidase and amylase prior to being separated into protease and ribonuclease fractions.

6 Claims, 1 Drawing Figure

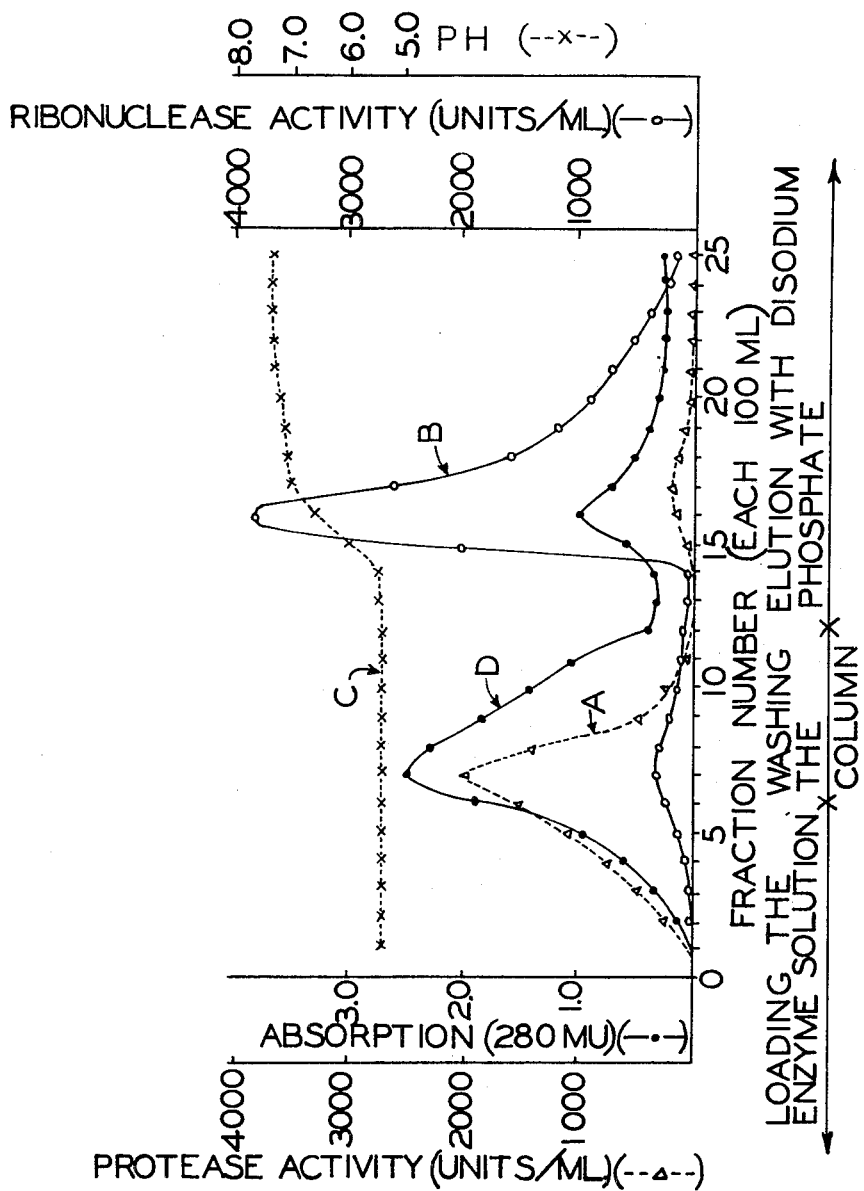

PROCESS FOR SIMULTANEOUS FRACTIONATION AND PURIFICATION OF PROTEASE AND RIBONUCLEASE OF RHIZOPUS MOLD

BACKGROUND AND PRIOR ART

It is known that a Rhizopus mold can produce enzymes containing amyloglucosidase, amylase, protease, and ribonuclease activities. This property has generally been commercially used to produce an amyloglucosidase product containing varying amounts of amylase, protease, and ribonuclease impurities. These protease and ribonuclease impurities can, in many instances, restrict the uses to which the above-produced amyloglucosidase can be employed.

It was then found that the above-produced amyloglucosidase can be purified to remove substantially all protease and ribonuclease activities by contacting an amyloglucosidase solution containing such activities with an anion-exchange material to selectively absorb the protease and ribonuclease. The purified amyloglucosidase fraction can then be separated from the anion-exchange material. It was known that the protease-ribonuclease mixture could be eluted from the anion-exchange material, but it was not known how to separate this mixture into purified protease and ribonuclease fractions.

SUMMARY OF THE INVENTION

In accordance with the present invention, a process is provided for the fractionation and purification of protease and ribonuclease produced from a Rhizopus mold comprising contacting a solution containing protease and ribonuclease produced from a Rhizopus mold with a cation-exchange material whereby the ribonuclease is selectively absorbed by the cation-exchange material to provide a purified protease fraction, separating said purified protease fraction from said cation-exchange material and then removing the ribonuclease from the cation-exchange material to provide a purified ribonuclease fraction.

DESCRIPTION OF THE DRAWING

The accompanying FIGURE shows characteristics of solution fractions obtained through practice of the process of the present invention.

DESCRIPTION OF THE PREFERRED EMBODIMENTS

The enzyme-containing raw materials useful in the present invention are conveniently obtained by growing a Rhizopus culture by the well-known gluten-koji process. A culture of *Rhizopus niveus* is preferably used to produce this raw material. After growing the culture for a suitable time, the mold mycelium is removed by filtration from the fermentation beer and is discarded. Non-enzymatic protein impurities can be removed from the filtrate by well-known ammonium sulfate precipitation. The resulting aqueous solution containing amyloglucosidase, amylase, protease and ribonuclease is then preferably treated to remove the amyloglucosidase and amylase. This is conveniently carried out by contacting the solution with an anion-exchange material, preferably a weakly basic anion-exchamge material having amine reactive groups, to selectively adsorb the protease and ribonuclease. The amyloglucosidase and amylase-containing liquid fraction can then be separated from the anion-exchange material. The protease and ribonuclease can then be eluted from the anion-exchange material by passing an organic acid solution, such as 0.1–0.4 N acetic acid or lactic acid, through such material.

The resulting protease and ribonuclease-containing solution can then be separated into purified protease and ribonuclease fractions. This solution is contacted with a cation-exchange material, preferably a strongly acidic cation-exchange material containing sulfonic acid reactive groups, to selectively absorb the ribonuclease. Especially useful cation-exchange materials are the porous phenolic materials having sulfonic acid groups marketed under the trade names Duolite C–10 and Duolite C–3. Materials based on acrylate resins and polystyrene can also be used. This is conveniently carried out by the simple process of flowing an aqueous solution containing protease and ribonuclease through a bed or column of cation-exchange material and withdrawing the so-purified protease solution from the bed or column. The ribonuclease remains behind in the bed or column. Alternatively, cation exchange material can be introduced to a solution containing protease and ribonuclease, allowed to remain until the ribonuclease is adsorbed, and then the cation-exchange material containing the ribonuclease can be removed from the so-purified protease solution.

The pH conditions in the protease-ribonuclease solution and in the cation-exchange column should be from about 5.2 to about 6.2 while the solution is contacting the cation-exchange material in order to get adequate separation between the protease and ribonuclease. When the pH is below about 5.2, protease is adsorbed by the cation-exchange material along with the ribonuclease. When the pH is above about 6.2, the protease tends to become deactivated and the ribonuclease is not effectively adsorbed by the cation-exchange material. The preferred pH conditions for contacting the protease-ribonuclease solution with the cation-exchange material are from about 5.4 to about 5.6. The temperature should also preferably be a low value, such as below 10° C., if possible. When the protease-ribonuclease solution is passed through a column of cation-exchange material, the flow velocity of the solution should preferably not exceed about 0.01 ml. of enzyme solution per cubic cm. of cation-exchange material per min. At higher flow velocities the ribonuclease is insufficiently adsorbed on the cation-exchange material.

After the purified protease fraction is separated from the cation-exchange material, the ribonuclease is removed by elution, for example, from such material by passing a buffer solution, such as a disodium phosphate solution, having a pH above about 6.0, preferably above about 6.8, through such material. When using a buffer solution having a strong ionic strength and having a pH inclining to the extreme alkaline side, the purity of the resulting eluted ribonuclease fraction is somewhat decreased. When using a buffer solution having a comparatively low ionic strength and a low alkalinity, a ribonuclease fraction having a very high purity can be obtained. Under these latter conditions, a comparatively larger amount of eluting buffer solution is required.

The above-preferred protease fraction can be further purified by ammonium sulfate to remove non-enzymatic proteins and by dialysis. The resulting solution can be further treated by column chromatography with carboxymethyl cellulose and can be easily separated as protease crystals.

The above-prepared ribonuclease fraction can be further treated by column chromatography with DEAE-cellulose.

The protease and ribonuclease fractions obtained by the process of the present invention can be used in a well-known manner for their enzymatic activities.

The invention will be further described in the following examples.

EXAMPLE 1

*Rhizopus niveus*, one of the Rhizopus molds, was cultured in sterilized gluten by the koji process at 30° C. for 3 days. The resulting culture medium was then mixed with three volumes of water at room temperature for 1 hour and filtered under pressure. The filtrate was adjusted to pH 5.2 and ammonium sulfate was added to a 30 percent saturation level. The resulting mixture was allowed to stand for 2 hours at 10° C. The resulting precipitate was removed by means of a continuous centrifugal separator. Ammonium sulfate was further added to the resulting filtrate to a 75 percent saturation level, and the resulting mixture was allowed to stand at 10° C. overnight. The resulting precipitate was collected by filtration and dissolved in three volumes of water. Calcium acetate at pH 5.2 was added to the resulting solution to form a precipitate with residual sulfate impurities. The resulting precipitate was separate from the supernatant liquid. The precipitate was washed with water and filtered using a filter aid. After adding this latter filtrate to the above supernatant liquid, the resulting liquid mixture was mixed with three volumes of cold isopropanol and allowed to stand overnight at 10° C. The formed precipitate was collected by centrifugation and dried. About 60 grams of this dry product were obtained from 1 kilogram of the raw gluten. In addition to amyloglucosidase and alpha-amylase, the product had enzymatic activities for protease and ribonuclease per gram of 40,000 and 20,000 units respectively. As used herein, one unit of protease means enzymatic activity capable of dissolving protein equivalent to one micromol of tyrosine in 5% trichloroacetic acid in 1 minute at 30° C. One unit of ribonuclease means enzymatic activity capable of liberating sufficient nucleic acid from a suitable substrate such that the light absorption of a solution of the liberated nucleic acid in 0.75% uranyl acetate is 1.73 measured with a light source having a wavelength of 260 millimicrons.

The above-prepared dry enzyme product was dissolved in 0.01 M acetic acid buffer solution to obtain a 10 percent enzyme concentration at pH 5.2. A 500 ml. portion of this solution was then passed down through a column (2.8 cm. dia. and 43 cm. long) of Duolite A-2, a porous weakly basic phenolic anion exchanger having amine reactive groups, while the pH of the column was maintained at 5.2 by the buffer solution. The amyloglucosidase and alphaamylase passed through the column while the protease and ribonuclease were retained by the column. The column was washed with about 500 ml. of 0.05 M acetic acid buffer solution at pH 5.2. A 200 ml. portion of 0.2 N acetic acid was then passed through the column to elute the protease and ribonuclease. The resulting eluate contained 50-60 percent ribonuclease and 40-50 percent protease, based on the total enzyme activities of the mixture.

The pH of the above-prepared mixture of protease and ribonuclease was adjusted to 5.4 by addition of caustic soda, and it was diluted with about 2.5 volumes of water to form a total solution volume of 600 ml. This solution was then passed through a column (2.8 cm. dia. and 43 cm. long) of Duolite C-10, a porous strongly acidic phenolic cation exchanger having sulfonic acid reactive groups, while the pH of the column was maintained at 5.4 with 0.05 M acetic acid buffer solution. After the enzyme solution passed through the column, the column was then washed with about 600 ml. of 0.05 M. acetic acid buffer solution at pH 5.4. The so-treated enzyme solution and the washing solution were then combined and the enzyme activities of the mixture were measured. Only protease activity was detected, and it was present in an amount of about 40 percent of the protease activity of the solution before it passed through the column. The specific activity of a given volume of solution was, however, about twice that of the starting solution.

A 0.1 M disodium phosphate solution was then passed down through the column. As the pH in the column became higher than 6.4, the ribonuclease began to elute. The total amount of ribonuclease activity recovered in the elute was about 40 percent of that in the starting solution. The specific activity was about five times that of the starting solution.

The above prepared separate purified protease and ribonuclease fractions could be easily treated further by carboxymethyl cellulose chromatography and DEAE-cellulose chromatography, respectively, to remove final traces of impurities.

EXAMPLE 2

A commercial Rhizopus amyloglucosidase material prepared by a solvent precipitation method was dissolved in water to form a 5 percent concentration. It was then dialyzed against 0.05 M acetic acid buffer solution at pH 5.4 across an animal membrane overnight. The resulting dialyzed solution contained, in addition to amyloglucosidase activity, protease and ribonuclease in amounts of 8,900 units per ml. and 5,000 units per ml., respectively. A 500 ml. portion of this solution was then passed down through a column (2.8 cm. dia. and 43 cm. long) of Duolite A-2 while the pH of the column was maintained at 5.4 by the acetic acid buffer solution. The protease and ribonuclease were retained by the column while the amyloglucosidase passed through the column. The retained enzymes were then eluted by passing 250 ml. of 0.2 N acetic acid and then 350 ml. of water through the column. The 600 ml. of elute contained 3,800 units per ml. of protease and 2,500 units per ml. of ribonuclease.

The pH of the above-prepared mixture of protease and ribonuclease was adjusted to 5.4 with caustic soda, and then the solution was applied to a column (3 cm. dia. and 40 cm. long) of Duolite C-10 while the pH of the column was maintained at 5.4 with the acetic acid buffer solution. The enzyme solution passed through the column at a flow velocity of about 0.01 ml. per min. per cubic cm. of the cation exchanger. After the enzyme solution passed through the column, the column was washed with 600 ml. of 0.05 M. acetic acid buffer solution at 5.4 to remove as much protease as possible. After washing with the buffer solution, a 0.05 M. disodium phosphate solution was passed through the column to elute the adsorbed ribonuclease. By these operations there were obtained separate purified fractions of predominantly protease and predominantly ribonuclease. The protease recovery was about 50 percent and the ribonuclease recovery was about 65 percent. The specific activity of the protease fraction was about 60 percent that of crystal protease subsequently prepared from such fraction. The specific activity of the ribonuclease fraction was about 70 percent that of subsequently chromatographic purified material.

The accompanying figures shows the characteristics of 100 ml. samples taken of material that had passed through the Duolite C-10 column. Curve A shows the protease activity. Most of the protease activity was removed from the column by the time 1,200 ml. (fraction number 12) had passed through the column (600 ml. of original sample plus 600 ml. wash liquid). Beginning with fraction number 15, the ribonuclease activity shown in Curve B starts to increase appreciably, because it is being eluted by the disodium phosphate. The pH values shown in Curve C start to increase in fraction number 15 to a level of 6 and above. The light absorption measured with a light source having a wavelength of 280 millimicrons is shown in Curve D. It can be clearly seen from this figure that a mixture of protease and ribonuclease can be separated into distinct fractions which are predominantly protease and predominantly ribonuclease.

What is claimed is:

1. A process for the fractionation and purification of protease and ribonuclease produced from a Rhizopus mold, comprising contacting a solution containing protease and ribonuclease produced from a Rhizopus mold with a cation-exchange material at a pH from about 5.2 to about 6.2 whereby the ribonuclease is selectively adsorbed by the cation-exchange material to provide a purified protease fraction, separating said purified protease fraction from said cation-exchange material and then removing the ribonuclease from the cation-exchange material at a pH above about 6.2 to provide a purified ribonuclease fraction.

2. A process according to claim 1 wherein the solution containing protease and ribonuclease is contacted with a cation-exchange material at a pH from about 5.4 to about 5.6.

3. A process according to claim 1 wherein the ribonuclease is removed from the cation-exchange material at a pH above about 6.8.

4. A process according to claim 1 wherein the solution containing protease and ribonuclease had previously been purified to remove amyloglucosidase and amylase.

5. A process according to claim 1 wherein the cation-exchange material is a strongly acidic cation-exchanger containing sulfonic acid reactive groups.

6. A process according to claim 1 wherein the protease and ribonuclease are produced from a *Rhizopus niveus*.

* * * * *